United States Patent [19]

Iwata et al.

[11] Patent Number: 4,963,214
[45] Date of Patent: Oct. 16, 1990

[54] METHOD FOR PRODUCING A WOODEN DECORATIVE ARTICLE

[75] Inventors: Ritsuo Iwata; Tomohide Ogata; Kaneo Omoto; Hironao Nagashima; Koji Nakajima; Yutaka Miyamoto, all of Shizuoka, Japan

[73] Assignee: Yamaha Corporation, Japan

[21] Appl. No.: 281,807

[22] Filed: Dec. 8, 1988

[30] Foreign Application Priority Data

| Dec. 8, 1987 | [JP] | Japan | 62-310024 |
| Dec. 9, 1987 | [JP] | Japan | 62-311617 |
| Dec. 9, 1987 | [JP] | Japan | 62-311618 |
| Dec. 10, 1987 | [JP] | Japan | 62-312499 |
| Dec. 10, 1987 | [JP] | Japan | 62-312500 |
| Dec. 29, 1987 | [JP] | Japan | 62-333221 |
| Dec. 29, 1987 | [JP] | Japan | 62-199882 |

[51] Int. Cl.$^5$ ............................................. B32B 31/00
[52] U.S. Cl. ..................................... 156/276; 156/154; 156/280; 156/298; 156/312; 428/67
[58] Field of Search ............... 156/154, 298, 276, 312, 156/280; 428/67

[56] References Cited

U.S. PATENT DOCUMENTS 3,887,415  6/1975  Elmendorf et al. ................. 156/298
4,276,329  6/1981  Vasishth et al. ..................... 524/389

Primary Examiner—John J. Gallagher
Attorney, Agent, or Firm—Ostrolenk, Faber, Gerb & Soffen

[57] ABSTRACT

In production of a planar wooden decorative article used for surface covering of furnitures and home interior decorations, a resin prepregnated sheet is prepared by impregnating a material sheet with hardenable resin solution and plurality of resin prepregnated sheets are combined with small wooden pieces to form a laminated composite which is then hardened by heating under pressure. The product has a rich woody impression due to inclusion of the small wooden pieces predominant in the surface region and high toughness coming from the laminated construction.

36 Claims, 4 Drawing Sheets 4,963,214

METHOD FOR PRODUCING A WOODEN DECORATIVE ARTICLE

BACKGROUND OF THE INVENTION

The present invention relates to method for producing a wooden decorative article, and more particularly relates to improvement in production of wooden decorative article suited for surface covering of furnitures, home interior decorations and car accessories.

Various methods have been conventionally proposed and practiced for production of such wooden decorative articles.

One method is proposed in Japanese Patent Application Sho. No. 62-117522, in which a mixture of hardenable resin solution with filler is shaped into a resin sheet, small wooden pieces are sprayed on one surface of the sheet, the wooden piece sprayed sheet is hardened by heating under pressure and the hardened sheet is surface ground. In the case of this conventional method, however, the product is rather poor in toughness. In addition, formation of the resin sheet is carried out in a batch system which is generally very low in productivity.

In another conventional method, a wooden material sheet is impregnated with hardenable resin solution to form a resin prepregnated sheet, a plurality of prepregnated sheets are superimposed to form a superimposed wood, small wooden pieces are sprayed on one surface of the superimposed wood and the superimposed wood is hardened by heating under pressure. In the case of this conventional method, however, the sprayed small wooden pieces are predominant in the surface section of the product and such biased disposition of the wooden pieces cannot provided the product with a deep, massive and woody impression.

The other conventional method is proposed in Japanese Patent Application Sho. No. 62-168114, in which a coloured and opaque resin layer is dispersed with small wooden pieces and a transparent resin layer containing glass fibers is superimposed on the opaque resin layer. The product is, however, rather poor in abrasion resistance and, in particular, unsuited for floor covering applications.

SUMMARY OF THE INVENTION

It is the basic object of the present invention to produce, at high productivity, wooden decorative articles having sufficient toughness.

It is another object of the present invention to produce wooden decorative articles having deep, massive and woody impression.

It is the other object of the present invention to produce wooden decorative articles having high abrasion resistance.

In accordance with the basic aspect of the present invention, a material sheet is impregnated with hardenable resin solution to form a resin prepregnated sheet, a laminated composite is formed from a plurality of the prepregnated sheets and small wooden pieces and the laminated composite is hardened by heating under pressure.

In one preferred embodiment of the present invention, a material sheet is impregnated with hardenable resin solution, to form a resin impregnated sheet, a plurality of the prepregnated sheets are superimposed to form a superimposed aggregate, small wooden pieces are placed on one surface of the superimposed aggregate to form a laminated composite and the laminated composite is hardened by heating under pressure.

In another preferred embodiment of the present invention, a material sheet is impregnated with hardenable resin solution to form a resin impregnated sheet, small wooden pieces are placed on one surface of the impregnated sheet to form a resin composite, a plurality of the resin composites are superimposed to from a laminated composite and the laminated composite is hardened by heating under pressure.

DESCRIPTION OF THE PREFERRED EMBODIMENTS

One embodiment of the method in accordance with the present invention starts with preparation of resin impregnated sheets. A material sheet generally takes the form of a woven cloth of glass fibers, polyamide fibers and polyester fibers, a glass paper or a non-woven cloth of acrylic fibers and vinylon fibers. The thickness of the material sheet is preferably in a range from 0.03 to 0.5 mm. In order to increase toughness of the product, a glass paper of 20 to 50 g/m$^2$ density is in particular preferred.

Next, the material sheet is impregnated with a solution of hardenable resin such as epoxy resin, unsaturated polyester resin, diallyl phthalate resin, polyurethane resin, silicone resin, phenol resin and acrylic viscosity of resin. When the resin solution has too high viscosity, it is preferable to dilute the solution with a proper solvent.

Depending on the required properties of the product, proper fillers and/or colouring agents may be added to the solution. Calcium carbonate, talc, titanium oxide, silica and glass powder are preferably used for the filler. Preferably, 50 to 200 parts by weight of a filler or fillers are added to 100 parts by weight of resin. Yellow, brown or dark brown pigments or dyestuffs are used for colouring.

Figure 1:
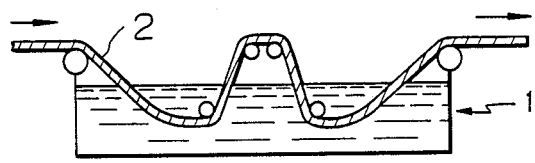
FIG. 1 is a side sectional view, partly in section, of a resin bath used in the method in accordance with the present invention.

One example of resin impregnation is shown in FIG. 1, in which a resin bath 1 filled with hardnable resin solution is kept at the room temperature or a constant temperature from 20° to 30° C. A material sheet 2 is passed through the resin bath 1 at a speed from 5 to 10 m/min for continuous resin impregnation. The material sheet 2 may be advanced intermittently with a 1 to 3 min to dwell in the resin bath 1 for better impregnation. The process conditions are preferably adjusted so that the degree of impregnation should be in a range from 50 to 300 g/m². Several material sheets may be concurrently passed through the resin bath 1 for higher operation efficiency.

After impregnation in the resin bath 1, the material sheet is left one night outside the resin bath 1 for primary drying at the room temperature. Secondary drying is performed at 90° to 100° C. for 5 to 10 min to obtain a resin prepregnated sheet 3a.

Figure 2:
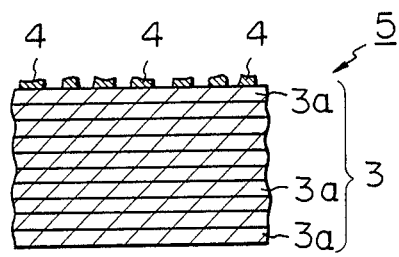
FIG. 2 is a side sectional view of a laminated composite, a middle product in one embodiment of the method of the present invention.

Next, preferably 8 to 10 prepregnated sheets 3a are superimposed together to form a superimposed aggregate 3 and, as shown in FIG. 2, small wooden pieces 4 are scattered on one surface of the superimposed aggregate 3 to form a laminate composite 5. The small wooden pieces 4 are preferably formed from used small pieces of broadleaf trees such as ebony, beech tree, oak, Japanese horse chestnut, maple and birch tree, or small pieces of needle-leaf trees such as cedar, hinoki, pine and cypress. Such small wooden pieces are obtained by mechanically crushing and/or roller pressing logs in various shapes. In the case of a rectangular solid shape, the width of each piece is preferably in a range from 3 to 50 mm, the length in a range from 3 to 100 mm and the thickness in a range from 0.2 to 2 mm. In the case of a columnar shape, the diameter of each piece is preferably in a range from 3 to 50 mm and the thickness in a range from 0.2 to 2 mm. In the case of random shapes, an average width in preferably in a range from 1 to 10 mm, an average length in a range from 3 to 100 mm and an average thickness in a range from 0.2 to 2 mm. Small pieces of different trees may be mixed. Proper treatment may be applied to the wooden pieces for dimensional stability.

For such stabilization, the wooden pieces may be treated with acetic anhydride, impregnated with polyethylene glycol or polypropylene glycol, or impregnated with a solution of resin same as those used for preparation of the resin impregnated sheet, i.e. phenol resin, epoxy resin, unsaturated polyester resin, diallylphthalate resin, polyurethane resin, silicone resin and acrylic resin. By addition of a proper antiseptic(s), an antiseptic treatment of the wooden pieces can be carried out concurrently with the dimensional stabilization. At least a part of the wooden pieces may be coloured. The natural colours of the wooden logs may be exploited for such colouring too. Use of ebony is one good example. For the colouring, the wooden pieces may be immersed into a colouring bath containing 0.1 to 10% by weight of colouring agent or agents. The bath may be more or less heated for deep colouring purposes.

Scattering of the wooden pieces can be carried out via a rough sieve or directly by hand. The degree of scattering should be adjusted so that 10 to 90%, more preferably 30 to 60%, of the surface of the superimposed aggregate 3 is covered with the small wooden pieces.

Before hardening of the laminated composite 5, the latter is left for 3 to 4 hr. at 15° to 30° C. in order to raise the viscosity of the resin and to release air pockets.

Figure 3:
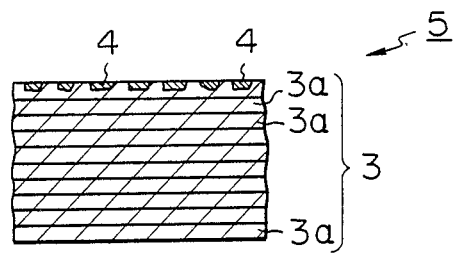
FIG. 3 is a side sectional view of one example of a wooden decorative article produced by the one embodiment of the method of the present invention.

Hardening of the laminated composite 5 is performed in a usual manner using, for example, a hot press. More specifically, a demolding film and an insert plate are placed on the laminated composite 5, placed in a mold and then heated at a temperature in a range from 130° to 150° C. and under a pressure in a range from 1 to 3 MPa for 10 to 30 min. By this heating under pressure, the impregnated sheets 3a are united together and the small wooden pieces 4 are forceably embedded into the uppermost impregnated sheet 3a as shown in FIG. 3 to produce a wooden decorative article.

Finally, the wooden decorative article thus obtained is preferably subjected to proper grinding in order to smooth the surface containing the small wooden pieces. Partial exposure of the small wooden pieces on the ground surface provides the product with a rich woody impression. A transparent layer 3b may be formed on the ground surface by application of a coat of resin such as polyester or polyurethane resin.

Thanks to the basic laminated construction of the resin prepregnated sheets, the wooden decorative article produced in accordance with the method of the present invention exhibits a high degree of toughness. In addition, as a plurality of material sheets can be impregnated concurrently or one after another quite continuously. A high production efficiency results. Uniformity in scattering of the small wooden pieces can be adjusted through visual inspection. Further, the predominance of the small wooden pieces in the surface region of the product provides the product with a rich woody impression even with reduced consumption of the small wooden pieces.

Although a planar decorative article is exemplified in the foregoing description, the product can take any other configurations depending on choice of the mold used for hardening.

In the case of the foregoing embodiment, the superimposed aggregate 3 is formed of a prescribed number (N) of impregnated sheets 3a and the small wooden pieces 4 are plated on the uppermost impregnated sheet 3a. In an alternative embodiment shown in FIG. 4, a superimposed aggregate 3 is formed of (N−1) of impregnated sheets 3a and, after hardening of a laminated composite 5, another impregnated transparent sheet 3b is overlaid on the hardened laminated composite which is then heated under pressure in order to unite the top impregnated transparent sheet 3b to the remaining sheets.

The wooden decorative articles so produced are used for polywoods, particle boards and bases for fiber reinforced plastic products. In particular, the product shown in FIG. 4 is used for house interior decorations and furnitures.

Figure 4:
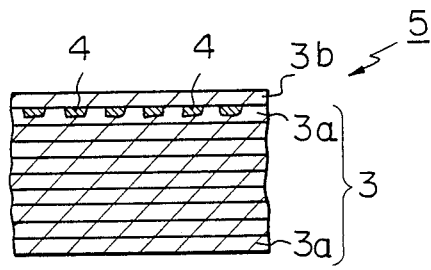
FIG. 4 is a side sectional view of another example of a wooden decorative article produced by the one embodiment of the method in accordance with the present invention.

In one modification of the embodiment shown in FIG. 4, the resin solution used for impregnation of the material sheets contains abrasion resistant particles. More specifically, 50 to 200 parts by weight of abrasion resistant particles are added to 100 parts by weight of the resin solution. When the content ratio falls short of 50 parts by weight, no satisfactory increase in abrasion resistance can be expected. When the content ratio exceeds 200 parts by weight the transparency of the product is marred. For the uppermost impregnated sheet 3b, a range from 50 to 100 parts by weight is preferably employed. After formation of a superimposed wood 3 formed of (N−1) of impregnated sheets 3a, small wooden pieces 4 are placed atop and a laminated composite 5 is subjected to hardening. Next, a impregnated sheet 3a impregnated with same resin solution is placed atop the hardened laminated composite 5 which is subjected to heating under pressure in order to unite the top prepregnated sheet 3a.

For the abrasion resistant particles are used particles of glass, graphite, calcium carbonate, molybdenum disulfide, barium sulfate, alumina and talc.

The average particle size is preferably in a range from 10 to 20 μm.

Transparent particles such as particles of glass are preferably used the uppermost prepregnated sheet 3b shown in FIG. 4. Different kinds of particles may be mixed.

In another modification of the embodiment shown in FIG. 4, the resin solution used for impregnation of the material sheets contains a highly incombustible agent or agents. In particular a material sheet used for the uppermost prepregnated sheet 3b shown in FIG. 4 should be preferably impregnated with a resin solution containing such an agent or agents.

More specifically 50 to 700 parts by weight of, more preferably 100 to 300 parts by weight of highly incombustible agent or agents are added to 100 parts by weight of the resin solution.

Phosphoric acid esters, halide hydrocarbons such as chlorinated paraffin and penta-ethyl bromide, antimony oxide and aluminum hydroxide are used for the highly incombustible agent. In particular inorganic highly incombustible agents such as antimony oxide and aluminum hydroxide are preferably used in order to reduce the content of combustible organic substances in the product. When the content ratio of the incombustible agents falls short of 50 parts by weight, no sufficient effect can be obtained. Whereas any content ratio above 700 parts by weight degrades fluidization of the resin component during the hardening step and develops fine pores in the surface of the product.

Figure 5:
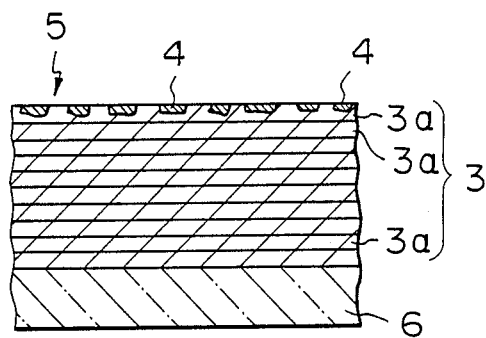
FIG. 5 is a side sectional view of one example of a wooden decorative article produced by another embodiment of the method in accordance with the present invention.

A product of a modified embodiment of the method in accordance with the present invention is shown in FIG. 5. In the case of this embodiment, a flexible resin sheet 6 is attached to the back surface of the laminated composite 5 after hardening by heating under pressure.

Flexible thermoplastic synthetic resins such as polyvinyl chloride are used for the flexible resin sheet 6. Such a synthetic resin may contain inorganic fillers at a content ratio preferably in a range from 100 to 500 parts by weight per 100 parts by weight of resin. Attachment of such a flexible resin sheet 6 can be carried out either by use of a proper bonding agent after the hardening of the laminated composite 5 or by thermal fusion during the hardening of the laminated composite 5. Epoxy or acrylic type bonding agents are preferably used for bonding in either aqueous or powdery state.

The presence of such a flexible resin sheet 6 well absorbs external shocks acting on the product.

The other embodiment of the method in accordance with the present invention also starts with the preparation of resin impregnated sheets and the resin impregnated sheets 3a are prepared in a manner same as that shown in FIG. 1.

Figure 6:
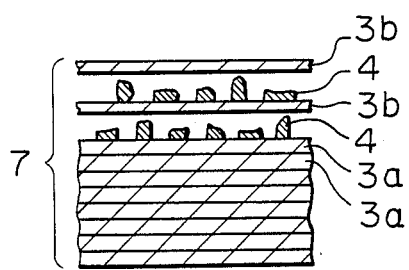
FIG. 6 is a side sectional view of a laminated composite, a middle product in the other embodiment of the method of the present invention.
Figure 7:
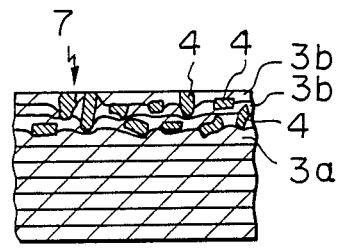
FIG. 7 is a side sectional view of one example of a wooden decorative article produced by the other embodiment of the method of the present invention.

Next, as shown in FIG. 6, several impregnated sheets 3a are superimposed, small wooden pieces 4 are placed atop the superimposed aggregate and an impregnated sheet 3b is placed on the small wooden pieces 4. Thereafter, alternate dispositions of the small wooden pieces 4 and the resin impregnated sheets 3b are repeated for prescribed times to obtain a decorative article such as shown in FIG. 7. In this case, the small wooden pieces 4 are predominant in the surface region of the laminated composite 7 which is then subjected to hardening by heating under pressure.

It is also possible to distribute the small wooden pieces 4 substantially uniformly over the entire body of a laminated composite. That is, after preparation of the resin impregnated sheets 3, small wooden pieces 4 are placed on each impregnated sheet 3a to form a resin composite. Next, a prescribed number of resin composites are superimposed to form a laminated composite which is then subjected to hardening by heating under pressure.

As is clear from the foregoing description, the method in accordance with the present invention is basically characterized by dispersing small wooden pieces into a resin matrix in order to provide the product with a woody impression. Starting from this basic feature, various modifications of the method can further be proposed.

Figure 8:
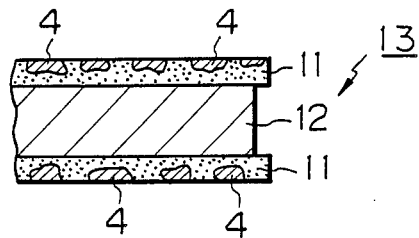
FIGS. 8 to 12B are side sectional views of sequential steps in one example of modifications employing the basic feature of the method in accordance with the present invention.

One example of such modifications is shown in FIGS. 8 to 12B. First, a decorative polywood such as shown in FIG. 8 is prepared. For this preparation resin is mixed with small wooden pieces 4 which are same as those used in the embodiments shown in FIGS. 1 to 7. Opaque resins are preferably used for this mixing. For example resins used for preparation of the impregnated sheet 3a are used. The resin mixture is next shaped into a flat composite resin sheet 11 of about 2 mm thickness. A base sheet 12 is separately prepared from lauans, particle boards or fiber reinforced plastics. The thickness is preferably in a range from 5 to 50 mm. The composite resin sheets 11 are bonded to both surfaces of the base sheet 12 to form a decorative polywood 13 such as shown in FIG. 8.

Figure 9A:
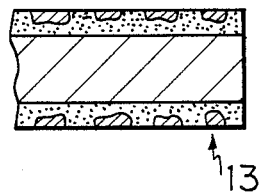
Figure 9B:
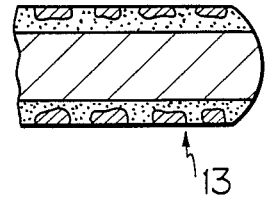

Next, one side end of the decorative polywood 13 is cut to obtain a smooth surface. The end may be cut into either a flat configuration such as shown in FIG. 9A or a round configuration such as shown in FIG. 9B depending on the end use. Cutting is carried out, for example, by sand papers of 40 to 60#, sand blasting or a plane cutter.

Figure 10:
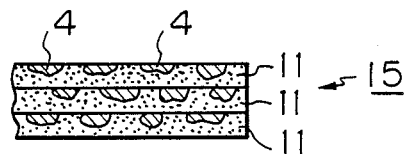

Concurrently with this procedure, a plurality of composite resin sheets 11 are superimposed to obtain a laminated composite 15 such as shown in FIG. 10. This laminated composite 15 is then hardened by heating under pressure. Process conditions for hardening are same as those employed in hardening of the laminated composites 5 and 7.

Figure 11A:
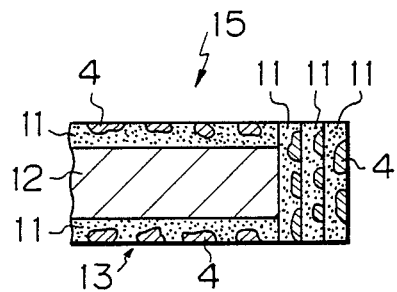
Figure 11B:
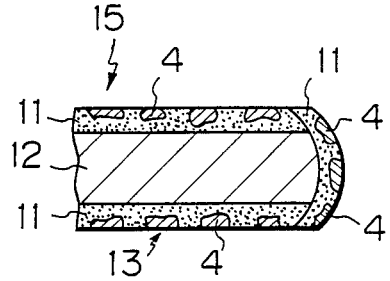

The laminated composite 15 so hardened is then bonded to the cut end of the decorative polywood 13 as shown in FIG. 11A. When the decorative polywood 13 has the round cut end as shown in FIG. 9B, it is sometimes preferred to bond only one composite resin sheet 11 to the cut end as shown in FIG. 11B. In either case, it is preferable that the small wooden piece predominant side of each composite resin sheet 11 should be located on the outer side remote from the cut end of the base sheet 12.

Figure 12A:
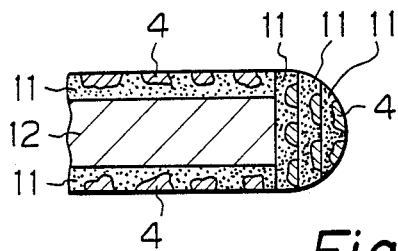
Figure 12B:
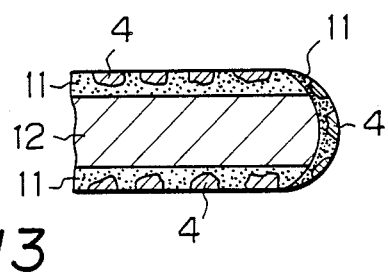

Finally, the outer surface of the bonded end is cut into desired round configuration such as shown in FIG. 12A or 12B. Additionally, a shaped end may be covered with a proper transparent resin coat for increased protection.

Figure 13:
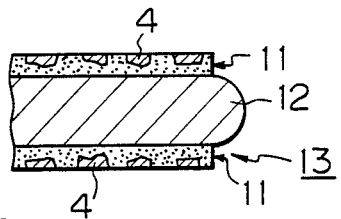
FIGS. 13 to 17 are side sectional views of sequential steps in another example of modifications employing the basic feature of the method in accordance with the present invention.

A modification of the foregoing method is shown in FIGS. 13 to 17, which starts from the decorative polywood 13 shown in FIG. 8. Like the foregoing embodiment, cutting is applied to one side end of the decorative polywood 13 as shown in FIG. 13. In this case, however, ends of the composite resin sheets 11 are shaped into a flat configuration and an associated end of the base sheet 12 is shaped into a round configuration projecting from the cut ends of the composite resin sheets 11.

Figure 14:
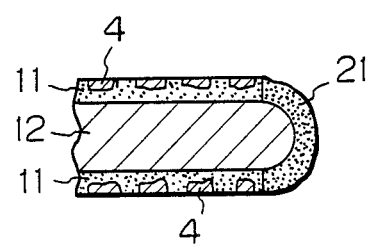

Next, the cut end of the base sheet 12 is coated with a resin layer 21 which has not yet been hardened. Resins used for preparation of the composite resin sheet 11 are again usable here. The thickness of the resin layer 21 is roughly same as that of the composite resin sheets 11 as shown in FIG. 14.

Figure 15:
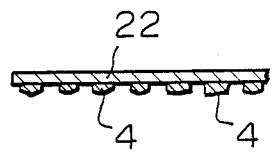

Next a one-face bonding tape 22 is prepared with small wooden pieces 4 bonded to one surface thereof as shown in FIG. 15.

The tape is made of cloth, paper, cellophane, polyvinyl chloride resin, polyethylene resin, polyester resin or fluorine resin. One face of the tape is coated with a bonding agent such as polyisobutylene, polyvinyl ether, polyvinyl butyral and polyacrylic acid ester. The bonding agent may additionally contain ester gum, phenol resin, cumarone resin, phthalic ester, paraffin chloride and diphenyl chloride. Colouring agents may be added too.

Figure 16:
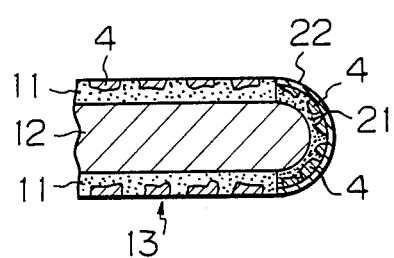

The bonding tape 22 is then attached to the resin layer 21 on the cut end of the base sheet 12 of the decorative polywood 13 so that the small wooden pieces 4 should be embedded in the resin layer 21 as shown in FIG. 16.

Figure 17:
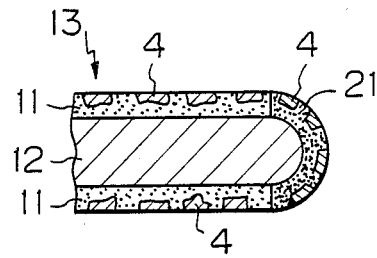

Finally, the decorative polywood 13 with the resin layer 21 and the bonding tape 22 is subjected to hardening by heating and, preferably, under pressure. For example, hardening is carried out at about 80° C., under about 0.1 MP. By application of finish cutting after hardening, a product such as shown in FIG. 17 is obtained.

EXAMPLES

Example 1

A resin solution bath was prepared by mixing 100 parts by weight of calcium carbonate and 5 parts by weight of yellow pigment. Keeping this resin bath constantly at 30° C., a glass paper of 50 g/m² density was passed through the bath at a speed of 7.5 m/min. After drying at 25° C. for 16 hr., the glass paper was cut into 10 impregnated sheets.

Beech trees and oaks were cut into small pieces of 1 to 5 mm width, 5 to 15 mm length and 0.2 to 0.5 mm width. After proper drying, the small wooden pieces were impregnated with epoxy resin and dried.

The 10 impregnated sheets were superimposed to form a superimposed aggregate and the small wooden pieces were placed on the top surface of the superimposed aggregate to form a laminated composite. 40 to 50% of the top surface was occupied by the wooden pieces.

The laminated composite was then hardened in a hot press at 140° C., under 15 MPa for 30 min. The surface was ground with a sand paper to obtain a wooden decorative article of 2 mm thickness, which had high toughness with deep and massive woody impression.

Example 2

Resin solutions were prepared as shown in Table 1.

TABLE 1

| Solution | Content in parts by weight | |
|---|---|---|
| | Epoxy resin | abrasion resistant particles |
| Sample I | 100 | 50 |
| Sample II | 100 | 100 |
| Sample III | 100 | — |
| Sample IV | 100 | 20 |

The solutions for the Samples I and II were prepared in accordance with the present invention whereas the solutions for the Samples III and IV were prepared for comparison.

Each resin solution bath was kept constantly at 30° C. and a glass paper was immensed in the resin solution bath for 2 min to obtain a resin prepregnated sheet. Glass particles ($SiO_2$) of 10 to 20 μm diameter were used for rise in abrasion resistance.

A further solution was prepared from 100 parts by weight of epoxy resin and 150 parts by weight of the abrasion resistant particles in order to impregnate a glass paper which was cut into 9 resin prepregnated sheets for superimposition. Small wooden pieces were prepared in a manner same as that in Example 1. The small wooden pieces were placed on the top surface of a superimposed aggregate made up of the 8 resin prepregnated sheets at an occupation rate of 45 to 55%. A laminated composite thus obtained was hardened in a hot press at 140° C., under 1 MPa for 30 min. After surface grinding with a sand paper, the first-mentioned prepregnated sheet was placed atop and the combination was again hardened in the same conditions.

The Sample so prepared were subjected to T-bar tests specified in JIS K 6902. In this test, a friction wheel loaded 500 g was placed on a sample which was rotated for 100 cycles for measurement of the extent of abrasion. The results are shown in Table 2.

TABLE 2

| Sample | Extent of abrasion (g) |
|---|---|
| I | 0.004 ~ 0.005 |
| II | 0.003 ~ 0.004 |
| III | 0.040 ~ 0.050 |
| IV | 0.016 ~ 0.030 |

As is clear from these results, the Samples I and II in accordance with the present invention exhibited high abrasion resistance.

Example 3

The first hardenable resin solution was prepared by mixing 50 parts by weight of methyl-ethyl ketone, 300 parts by weight of aluminum hydroxide, 20 parts by weight of phosphoric acid type of incompatible agent and 3 parts by weight of yellow pigment with 100 parts by weight of epoxy resin. A glass paper of 50 g/m² was immensed in a 30° C. bath of this resin solution for 1 min. After drying at 130° C. for 2 min, the glass paper was cut into 10 resin prepregnated sheets.

Beech trees and oak were cut into small wooden pieces of 3 to 10 mm width, 5 to 30 mm length and 0.2 to 3.0 mm thickness, which were then immersed in the above-described resin solution bath and left at the room temperature.

The above-described 10 resin impregnated sheets were superimposed and the small wooden pieces were placed on the top surface of a superimposed aggregate so that 40 to 50 % of the top surface was covered. After leaving the composite for 15 min at the room temperature, the laminated composite was hardened in a hot press by heating at 140° C., under 1 MPa for 10 min. The surface of the hardened laminated composite was ground with sand papers to obtain a Sample V of 2.0 mm thickness.

The second hardenable resin solution was prepared by mixing 0.2 parts by weight of yellow pigment with 100 parts by weight of epoxy resin. Under conditions same as those employed in preparation of the impregnated sheets for Sample V, 9 sets of second resin impregnated sheets were obtained. Clearly, the second resin impregnated sheets contains no incompatible agent.

The third hardenable resin solution was prepared by mixing 50 parts by weight of methyl-ethyl ketone, 300 parts by weight of aluminum hydroxide, 20 parts by weight of phosphoric acid type incompatible agent with 100 parts by weight of epoxy resin. Under conditions same as those employed in preparation of the resin impregnated sheets for Sample V, 1 set of third resin impregnated sheet was obtained.

On the top surface of a superimposed aggregate formed of the 9 sets of second resin impregnated sheets, wooden pieces used for Sample V were placed so that 85 to 90% of the top surface should be covered. A laminated composite thus prepared was hardened in a hot press at 140° C., under 1 MPa for 5 min. After surface grinding, the third resin impregnated sheet was placed atop the hardened laminated composite. By heating at 140° C., under 1 MPa for 10 min, a Sample VI of 2.5 mm thickness was obtained.

The Samples V and VI were subjected to burning test for measurement of incombustibility. The resultant oxygen indices were 28.0 for Sample V and 30.0 for Sample VI.

Example 4

A hardnable resin solution was prepared by mixing 100 parts by weight of calcium carbonate and 5 parts by weight of yellow pigment with 100 parts by weight of epoxy resin. A glass paper of 50 g/m² density was immersed in a bath of this resin solution and left for 16 hr. at 25° C. to obtain resin impregnated sheets.

Small wooden pieces were prepared in a manner same as in the foregoing Examples. The small wooden pieces were placed on the top surface of a superimposed aggregate formed of 10 sets of resin impregnated sheets so that 40 to 50% of the top surface should be covered.

A resin mixture formed of 100 parts by weight of polyvinyl chloride and 250 parts by weight of inorganic composite fillers was heated under pressure in order to obtain a flexible resin sheet of 2 mm thickness.

This flexible resin sheet was attached to the rear face of a laminated composite made up of the superimposed aggregate and the small wooden pieces and the combination was hardened at 140° C., under 15 MPa for 30 min. By surface grinding, a sample of the decorative article in accordance with the present invention was obtained.

The sample was then subjected to high heeled shoes tests. In this test, the sample was bonded to a flat floor surface and the heel of a shoes of 4 mm diameter was pressed against the sample for 36 sec with a load of 100 kg in order to measure the extend of depression in the sample. Strength of bonding to the flood surface was also surveyed. For comparison, a decorative article accompanied with no rear face flexible resin sheet was subjected to same tests and measurements. The results are shown in Table 3.

TABLE 3

|  | sample | comparative sample |
| --- | --- | --- |
| Depression in mm | 0.01 | 0.3 |
| Bonding strength | O | x |

From this experimental result, it is clear that presence of the rear face flexible resin sheet is very effective in rising resistance against impulsive load on the product.

Example 5

A resin solution was prepared by mixing 250 parts by weight of calcium carbonate and 1 part by weight of yellow pigment with 100 parts by weight of epoxy resin. Keeping a bath of this resin solution constantly at 30° C., a glass paper of 50 g/m² was immersed. By drying at 25° C. for 16 hr., 10 sets of resin impregnated sheets were prepared.

Small wooden pieces prepared as in the foregoing Examples were placed on the top surface of each resin impregnated to from a resin composite so that 45 to 55% of the top surface should be covered. 8 sets of resin composites were superimposed and a resin impregnated sheet was placed atop the superimposed combination to form a laminated composite which was then heated at 140° C., under 1 MPa for 30 min. for hardening. Uniform distribution of the small wooden pieces was well observed though the entire body of the product which gave deep and massive woody impression.

Example 6

A resin paste was prepared by mixing 200 parts by weight of calcium carbonate and 5 parts by weight of yellow pigment with 100 parts by weight of unsaturated polyester resin.

Beech trees and oaks were cut into small pieces of 1 to 5 mm width, 5 to 15 mm length and 0.2 to 2 mm thickness. After impregnation with unsaturated polyester resin the wooden pieces was mixed with the resin paste to form a resin mixture which was then shaped into a composite resin sheet of 3 mm thickness. Hardening was carried out in a hot press at 140° C., under 3 MPa for 2 min.

Two sets of composite resin sheets were bonded to both surface of a lauan base sheet of 12 mm thickness to obtain a decorative polywood such as shown in FIG. 8. One end of the decorative polywood was cut into a flat configuration such as shown in FIG. 9A.

The cutend of the decorative polywood were covered with 3 sets of composite resin sheets and the combination was heated at 80° C., under 0.1 MPa for 30 min. By properly shaping the hardened cutend a product such as shown in FIG. 12A was obtained.

Example 7

The resin paste, the resin mixture and the composite resin sheets were prepared as in Example 6 with the only exception that the thickness of the composite resin sheet was 1.5 mm.

Using the composite resin sheets, a decorative polywood same as in Example 6 was obtained and one end thereof was cut as shown in FIG. 13.

The cut end of the decorative polywood was then coated with epoxy resin made up of 100 parts by weight of Epycoat #815 (trade name), 33 parts by weight of Epymate LX-1 (trademark) and 240 parts by weight of calcium carbonate.

A one-face bonding tape carrying the small wooden pieces was pressed against the epoxy resin coat on the cutend and the combination was heated at 80° C., under 0.1 MPa for 30 min. for hardening purposes. By application of finish cutting, a product such as shown in FIG. 17 was obtained.

What is claimed is:

1. A method for producing a wooden decorative article, said method comprising the steps of:
   impregnating a material sheet made of woven fibers with hardenable resin solution to form a resin impregnated sheet;
   placing small wooden pieces on a surface of said impregnated sheet to form a laminated composite; and
   hardening said laminated composite by heating under pressure.

2. A method as claimed in claim 1 in which said step of forming said laminated composite includes the steps of:
   superimposing a plurality of said resin impregnated sheets to form a superimposed aggregate; and
   placing said small wooden pieces on one surface of said superimposed aggregate.

3. A method for producing a wooden decorative article comprising the steps of:
   impregnating a material sheet made of interlaced fibers with hardenable resin solution to form a resin impregnated sheet;
   superimposing a plurality of said resin impregnated sheets to form a superimposed aggregate;
   sequentially placing additional resin impregnated sheets, one on top of another, onto one surface of said superimposed aggregate and placing small wooden pieces on each said additional resin impregnated sheet to form a laminated composite; and
   hardening said laminated composite by heating under pressure.

4. A method for producing a wooden decorative article comprising the steps of:
   impregnating a plurality of material sheets made of interlaced fibers with hardenable resin solution to form a plurality of resin impregnated sheets;
   placing small wooden pieces on one surface of each said resin impregnated sheet to form resin composites;
   superimposing a plurality of said resin composites to form a laminated composite; and
   hardening said laminated composite by heating under pressure.

5. A method as claimed in one of claims 1, 3 or 4, in which
   said material sheet is selected from the group consisting of a woven cloth of glass fibers, polyamide fibers and polyester fibers.

6. A method as claimed in one of claims 1, 3 or 4 in which
   said material sheet has a thickness in a range from 0.03 to 0.5 mm.

7. A method as claimed in one of claims 1, 3 or 4 in which
   said hardenable resin is selected from the group consisting of epoxy resin, unsaturated polyester resin, diallylphthalate resin, polyurethane resin, silicone resin, phenol resin and acrylic resin.

8. A method as claimed in one of claims 1, 3 or 4 in which
   said hardenable resin contains fillers.

9. A method as claimed in claim 8 in which
   said fillers are selected from the group consisting of calcium carbonate, talc, titanium oxide, silica and glass power.

10. A method as claimed in claim 8 in which
    50 to 200 parts by weight of said fillers are contained in 100 parts by weight of said hardenable resin.

11. A method as claimed in one of claims 1, 3 or 4 in which
    the degree of impregnation of said hardenable resin is in a range from 50 to 300 g/m$^2$.

12. A method as claimed in one of claims 1, 3 or 4 in which
    drying is carried out after impregnation of said hardenable resin at a temperature in a range from 90° to 100° C.

13. A method as claimed in claim 12 in which
    said drying is carried out for a period in a range from 5 to 10 min.

14. A method as claimed in one of claims 1, 3 or 4 in which
    said small wooden pieces are selected from the group consisting of ebony, beach three, oak, cedar, hinoki, pine and cypress.

15. A method as claimed in one of claims 1, 3 or 4 in which
    each said small wooden piece has a rectangular solid shape which is in a range from 3 to 50 mm in width, in a range from 3 to 100 mm in length and in a range from 0.2 to 2 mm in thickness.

16. A method as claimed in one of claims 1, 3 or 4 in which
    each said small wooden piece has a circular shape which is in a range from 3 to 50 mm in diameter and in a range from 0.2 to 2 mm in thickness.

17. A method as claimed in one of claims 1, 3 or 4 in which
    said small wooden pieces have random shapes which are in a range from 1 to 10 mm in average width in a range from 3 to 100 mm in average length and in a range from 0.2 to 2 mm in thickness.

18. A method as claimed in one of claims 1, 3 or 4 in which
    said small wooden pieces are treated with a stabilizing agent to stabilize the dimensions of said small wooden pieces.

19. A method as claimed in claim 18 in which
    the agent for said stabilization is selected from the group consisting of acetic anhydride, polyethylene glycol, polypropylene glycol, epoxy resin, unsaturated polyester resin, diallylphthalate resin, polyurethane resin, silicone resin, phenol resin and acrylic resin.

20. A method as claimed in one of claims 1, 3 or 4 in which
    said small wooden pieces occupy 10 to 90% of a surface to be covered thereby.

21. A method as claimed in one of claims 1, 3 or 4 in which
    said laminated composite is left 3 to 4 hr. a 15° to 30° C. before said hardening.

22. A method as claimed in one of claims 1, 3 or 4 in which
    said hardening is carried out at a temperature in a range from 130° to 150° C.

23. A method as claimed in one of claims 1, 3 or 4 in which
said hardening is carried out under a pressure in a range from 1 to 3 MPa.

24. A method as claimed in one of claims 1, 3 or 4 in which
said hardening is carried out for a period in a range from 10 to 30 min.

25. A method as claimed in one of claims 1, 3 or 4 in which
said hardenable resin solution contains abrasion resistant particles.

26. A method as claimed in claim 25 in which
the content ratio of said abrasion resistant particles is in a range from 50 to 200 parts by weight per 100 parts by weight of said hardenable resin solution.

27. A method as claimed in claim 25 in which
said abrasion resistant particles are made of at least one substance selected from the group consisting of glass, graphite, calcium carbonate, molybdenum disulfide, barium sulfate, alumina and talc.

28. A method as claimed in claim 25 in which
the average size of said abrasion resistant particles is in a range from 10 to 20 $\mu$m.

29. A method as claimed in claim 25 in which
said abrasion resistant particles are transparent.

30. A method as claimed in one of claims 1, 3 or 4 in which
said hardenable resin solution contains at least one highly incombustible agent.

31. A method as claimed in claim 30 in which
the content ratio of said at least one highly incombustible agent is in a range from 50 to 700 parts by weight per 100 parts by weight of said hardenable resin solution.

32. A method as claimed in claim 30 in which
said at least one highly incombustible agent is selected from the group consisting of phosphoric acid esters, halide hydrocarbons, antimony oxide and aluminium hydroxide.

33. A method as claimed in one of claims 1, 3 or 4 further comprising the step of
attaching a flexible resin sheet to the rear surface of said laminated composite after said hardening step.

34. A method as claimed in claim 33 in which
said flexible resin contains inorganic fillers.

35. A method as claimed in claim 34 in which
the content ratio of said inorganic fillers is in a range from 100 to 500 parts by weight per 100 parts by weight of resin.

36. A method as claimed in claim 33 in which
said flexible resin sheet is attached by bonding.

* * * * *